April 7, 1931.  W. L. REINHARDT  1,799,248
METHOD OF DRYING ARTICLES
Original Filed Nov. 10, 1924

Inventor
Willard L. Reinhardt
by Thurston Kwis & Hudson
attys.

Patented Apr. 7, 1931

1,799,248

UNITED STATES PATENT OFFICE

WILLARD L. REINHARDT, OF EAST CLEVELAND, OHIO, ASSIGNOR TO WILLARD STORAGE BATTERY COMPANY, OF CLEVELAND, OHIO, A CORPORATION OF WEST VIRGINIA

METHOD OF DRYING ARTICLES

Application filed November 10, 1924, Serial No. 749,108. Renewed November 25, 1927.

This invention relates to a process of drying without oxidation or "permanizing" storage battery plates, and has particular reference to the drying of negative plates which are to be stored until used, or employed in storage batteries designed to be stored or shipped in a dry state or without electrolyte.

The principal object of the present invention is to provide a method of drying storage battery plates economically and quickly without oxidation or material oxidation.

Figure 1:
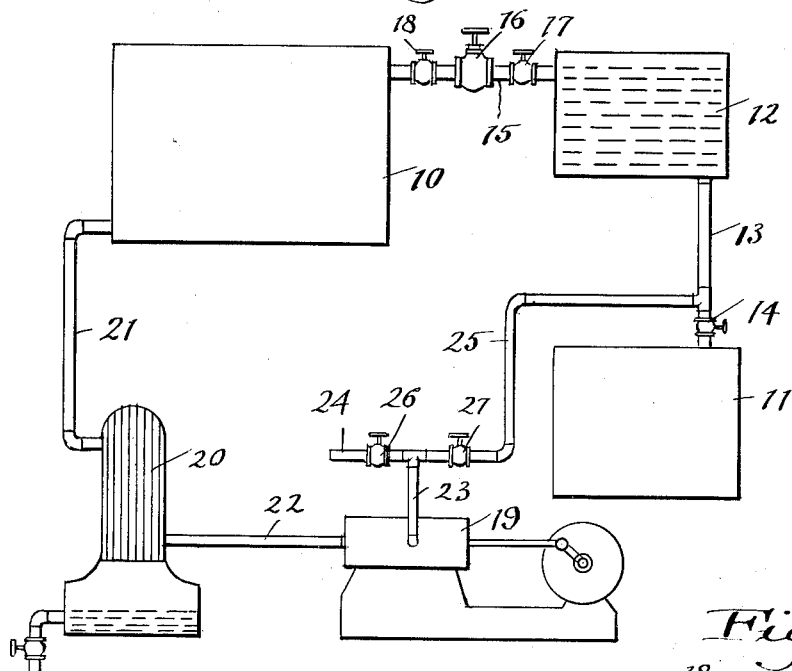
Figure 2:
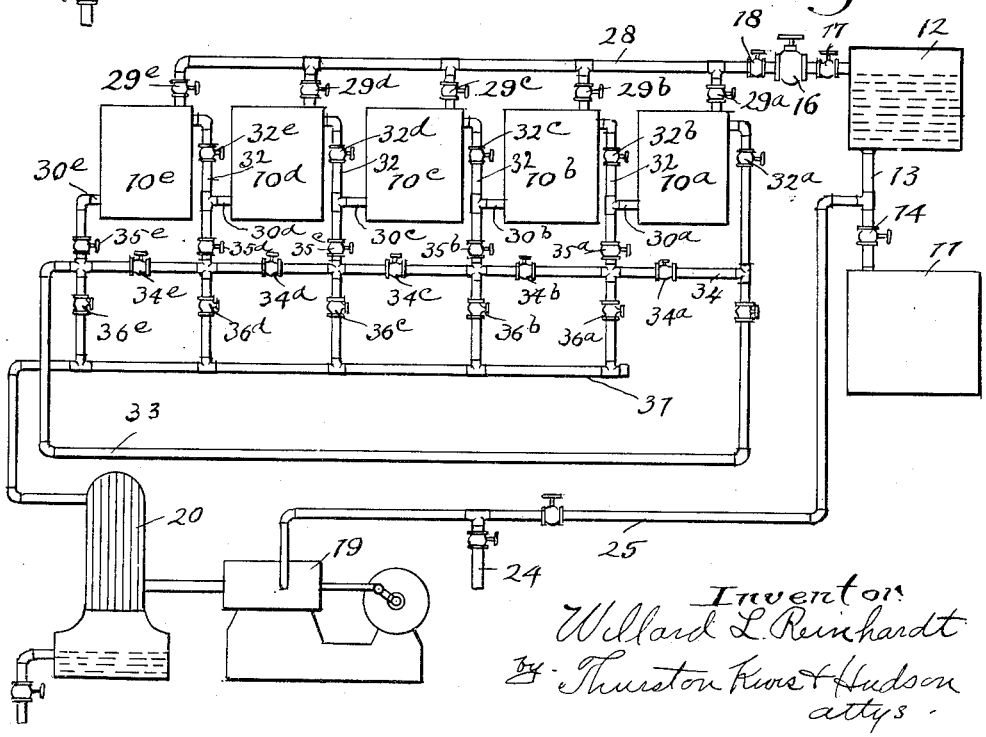

The preferred way of carrying out my invention is illustrated in the accompanying sheet of drawings wherein Fig. 1 is a conventional representation in simplified form of apparatus which may be used to advantage; and Fig. 2 is a similar view wherein several drying chambers may be used to advantage to effect further economies.

It may be assumed that the positive and negative plates are pasted in the usual manner and are then subjected to the regular charging or forming process wherein the lead oxide of the negative plates is electrolytically converted to sponge lead and the paste of the positive plates is converted from lead oxide to lead peroxide.

The drying of positive plates involves no problem since the question of oxidation in drying is not present, and these plates are dried in the usual way.

The negative plates, however, should be dried without material oxidation in order that they may be stored or shipped in batteries without electrolyte, without loss of capacity and without requiring recharging when the batteries are put into use. In the event that the plates are not dried immediately after being formed, they should be completely immersed in some liquid which will prevent oxidation, and, if desired, they may be dipped into a solution which after drying will leave a coating and prevent the admittance of moisture into the pores of the plate.

In accordance with my invention, the negative plates are placed in a drying chamber and subjected to the action of a heated inert gas. The plates will be supported in the chamber in a manner such that there may be a uniform circulation of the heated inert gas around the plates. Various inert gases may be employed, and among these might be mentioned carbon monoxide, hydrogen, nitrogen, carbon dioxide, steam, alcohols, benzines and aldehydes. The gases above mentioned do not include all which may be used in carrying out my process, and the process is not confined to the use of any one inert gas alone, but may include a combination of two or three of the same. For example, it may be necessary, or desirable, to use a mixture of two or more, in case there are fire or explosive hazards connected with one particular gas; in such case, other gas or gases may be used to dilute such gas in order that these hazards may be eliminated.

By my improved process the plates are subjected to the heated inert gas at a pressure below atmospheric and at a suitable temperature under the melting point of lead. The heated gas is passed through the drying chamber referred to above, and due to the reduced pressure the moisture in the plates is evaporated much more readily than at atmospheric pressure, or above atmospheric pressure.

It is another feature of the invention that after the heated inert gas is passed through the drying chamber until all or practically all of the moisture is evaporated and practically all of it carried away with the gas from the chamber, the chamber is evacuated so as to draw from the chamber as much of the inert gas as possible and to remove from the now dried plates whatever water vapor may be in the pores of the active material. Obviously, since the drying is conducted by passing the heated inert gas through the chamber at a pressure below atmospheric, the evacuation to the desired degree of vacuum may be accomplished in a shorter period of time than if the drying is accomplished by the heated inert gas at or above atmospheric pressure.

The process briefly referred to above, may be carried out with different kinds of apparatus, and in many different ways, and it is to be understood that I do not desire my invention to be confined to the use of apparatus such as illustrated. In Fig. 1 the drying chamber in which the plates are placed, is indicated at 10 and the inert gas is supplied to this chamber from a suitable source indicated at 11. The gas may be heated in any suitable way and to any degree which with any particular gas produces the best results. Generally the temperature of the gas circulated through chamber 10 will be above the boiling point of water at atmospheric pressure, but since the pressure in chamber 10 during the drying period is below atmospheric, the only essential temperature characteristic is that the temperature be above the boiling point of water at the pressure existing in chamber 10. Obviously, however, the higher the temperature the quicker the moisture in the plates is evaporated and I may use any temperature below the melting point of lead.

As stated above, the inert gas may be heated to the desired temperature in any desired manner, but in this instance I show between the source 11 and chamber 10 a heater 12 in which the temperature of the inert gas or vapor is raised to the required degree. The chamber 11 is shown connected to the heater 12 by a pipe 13 having a valve 14, and the heater 12 is connected to chamber 10 by a pipe 15 containing a pressure reducing valve 16 and preferably two shut-off valves 17 and 18, one provided on each side of the reducing valve.

In accordance with my invention, the gas is circulated or passes through chamber 10 by being sucked or drawn from source 11 through heater 12, reducing valve 16 and chamber 10 by means of a vacuum pump 19. In this instance I show between the vacuum pump and chamber 10 a condenser 20 which is connected to the chamber 10 by a pipe 21 and to the vacuum pump by a pipe 22. In this condenser 20 the moisture carried by the inert gas or vapor drawn from the chamber 10 by the pump is condensed.

The vacuum pump 19 is provided with an outlet pipe 23. This may discharge to atmosphere through an outlet 24, but preferably the inert gas is conserved and circulated over and over again through the apparatus, and to that end outlet pipe 23 is connected to a pipe 25 to re-introduce the gas into the circulating system. This pipe may be connected for this purpose to pipe 13. In order that the gas may be discharged either to atmosphere, or into the system, as just stated, outlet pipe 24 and pipe 25 are provided with shut-off valves 26 and 27.

It might be here stated, that when a dry vacuum pump is used, the condenser is desirable, even when the pump discharges to atmosphere, but if a so-called wet vacuum pump is employed, the condenser will not be necessary if the pump discharges to atmosphere.

In operation, after the plates have been placed in chamber 10, the drying operation is started by opening valves 14, 17 and 18 and by starting the vacuum pump 19; the pump pulls the heated inert gas through the reducing valve 16 and through drying chamber 10 to the condenser 20, the pressure in chamber 10 being, of course, below atmospheric. The gas in passing through the drying chamber 10 will give up heat to the wet plates, and the temperature of the moisture in these plates will be raised above the boiling point and, consequently, the moisture will be evaporated. This mixture of water vapor and inert gas is then drawn through the condenser 20 where it is cooled sufficiently to allow the water to condense and the gas to pass on to the air, or to be again heated and re-circulated through the system.

The plates are subjected in this manner to the action of the heated gas until a large percentage of the moisture originally contained in the plates has been evaporated. When this has been accomplished the flow of gas is shut off, but the operation of the pump is continued and the drying chamber is evacuated. This not only clears the chamber and plates of the inert gas, but completes the drying operation by evaporating whatever moisture may have been left unevaporated in the plates, it being understood that the temperature of the heated gas will be high enough to impart to the plates enough heat to evaporate the remaining moisture within the plates at the low pressure created by the evacuation of the chamber. The evacuation is continued for a suitable length of time, then the pump is stopped, air is re-admitted to the chamber 10 and the now dried plates are removed.

The feature of re-circulating the inert gas through the drying chamber may be utilized advantageously when the gas used is sufficiently expensive to warrant its conservation. Operating in this manner the only inert gas that would be supplied to the system would be just enough to compensate for the losses in operation.

The first heated gas withdrawn from the drying chamber will be saturated with water vapor, while the last portion withdrawn will have very little water vapor present. This condition or situation can be utilized to advantage to effect further economies in operation by the use of a plurality of drying chambers and by passing the heated gas through two or more in series, particularly after the water vapor content of the gas has decreased to some predetermined point. An arrangement whereby this can be accomplished is shown in Fig. 2, wherein I have shown five drying chambers, 10a, 10b, 10c, 10d and 10e. A source of inert gas 11 and a heater 12 are used as in Fig. 1, the source and heater being connected by a pipe 13 preferably containing a valve 14 as in the first instance, the heater being provided with an outlet pipe here designated 28, the same being provided with a reducing valve 16, such as previously described, and provided on each side, if desired, with shut-off valves 17 and 18, similar to those in Fig. 1. In this instance the pipe 28 on the low pressure side of the reducing valve 16 is connected by branches having valves 29a, 29b, 29c, 29d and 29e to the five drying chambers 10a, 10b, etc.

Through these branches the heated gas can be supplied to any of the five chambers. Additionally the chambers are provided with outlet pipes through which the heated gas or vapor is drawn by the vacuum pump 19, these outlet pipes being designated 30a, 30b, 30c, 30d and 30e. These five outlets may discharge in a common outlet pipe 31 which is connected to the condenser 20, in turn connected to the vacuum pump 19, as in the first instance; this vacuum pump having an outlet pipe 25 with a valved branch pipe 24 leading to the atmosphere and a valved portion leading to pipe 13, as in the arrangement first described.

The outlet pipes 30a, 30b, 30c and 30d are connected by branches 32 having valves 32b, 32c, 32d and 32e to the chambers 10b 10c, 10d and 10e so that the heated gas, after passing through one chamber, may be introduced into the next adjoining chamber. Similarly the outlet pipe 30e communicates by means of a pipe 33 and a branch containing a valve 32a with chamber 10a. Additionally, the pipe 33 communicates by pipe sections 34 having valves 34a, 34b, 34c, 34d and 34e with the outlet pipes 30a, 30b, 30c, 30d and 30e and these outlet pipes are provided above the pipe sections 34 with valves 35a, 35b, 35c, 35d and 35e and below the pipe sections 34 with similar valves 36a, 36b, 36c, 36d and 36e.

With this arrangement it is possible to connect any of the chambers in series, the operation being as follows: Let it be assumed that the heated gas is first passed through chamber 10a alone. At the start of the operation the gas sucked through the chamber (below atmospheric pressure, as before) by the vacuum pump, will be supersaturated with water vapor, and it will, therefore, be conducted through valves 35a and 36a to the outlet pipe 31. As soon as the saturation of the gas has decreased to some predetermined point, say 80 per cent, which may require from two to five minutes, the gas after leaving the first chamber 10a is then drawn through the second chamber 10b, containing wet plates; this is done by closing valve 35a, opening valves 32b, 35b and 36b, the gas first passing to the common outlet pipe 31 and after the saturation with water vapor has been reduced to about 80 per cent (or to any other desired value), the heated gas passing through chambers 10a and 10b is now conducted also through chamber 10c by closing valve 35b and opening valves 32c, 35c and 36c. This can be continued so as to connect other chambers in series with chambers 10a, 10b and 10c, but generally it will only be necessary or profitable to connect three chambers in series. When the plates in chamber 10a are dried, valve 29a will be closed and the heated gas is introduced from pipe 28 through valve 29b to chamber 10b. At the same time, chamber 10a will be evacuated by closing valve 32b and opening valves 35a and 36a.

This same process is continued for the successive chambers, the plates being successively dried in the different chambers, and while the heated gas is being drawn through two or three of the chambers in series, the vacuum pump which creates the flow is utilized to evacuate the chamber preceding the group thus connected and containing the dried plates. When the plates in the chamber 10c are dried, chambers 10d and 10e can be connected in series with chamber 10a by way of pipe 33 and valve 32a, and in a similar manner chamber 10e can be connected in series with chambers 10a and 10b; in fact, with the apparatus shown, it is possible to draw the heated gas through any three or more adjoining chambers, or through one or more at the end of the series with one or more at the head or beginning of the series at the same time that some other chamber is being evacuated.

Obviously, by passing the gas through two or more in series, while another chamber is being evacuated, the system can be operated very economically.

The number of chambers may, of course, be multiplied, but the number shown is now preferred by me, since the heated gas can be drawn by the vacuum pump through three chambers while a fourth chamber is being evacuated, and while the fifth chamber is being relieved of the dried plates and re-charged with wet plates. In this manner the different chambers can be operated successively by having the heated gas circulated through them, then evacuated to complete the drying process, and then relieved of the dried plates and re-charged with wet plates, the process being carried on practically continuously with the result that large quantities of plates can be dried at very low cost and without oxidation or material oxidation.

Having described my invention, I claim:

1. The method of drying articles which comprises passing a heated gas through a chamber containing such articles until a predetermined amount of the moisture has been carried away, and then connecting said chamber in series with another chamber containing wet articles.

2. The method of drying articles which comprises passing a heated gas successively through different chambers containing the articles, and at the same time evacuating the chamber in which the articles have been dried.

3. The method of drying articles which comprises passing a heated gas successively through different chambers serially connected, successively removing the chambers containing dried articles from the circuit, and evacuating the same.

4. The method of drying articles in a series of drying chambers which comprises drawing a heated gas through one chamber until a certain amount of moisture has been carried away, then causing the gas to be drawn from this chamber and through another chamber in series therewith, and subsequently disconnecting the first chamber from the circuit.

5. The method of drying articles in a series of drying chambers which comprises drawing a heated gas through one chamber until a certain amount of moisture has been carried away, then causing the gas to be drawn from this chamber and through another chamber in series therewith, and subsequently disconnecting the first chamber from the circuit and evacuating it.

6. The method of drying articles in a series of chambers containing such articles which comprises drawing a heated gas through one chamber until a predetermined amount of moisture has been carried away, then drawing the gas or vapor through said chamber and through another chamber serially connected, and after a certain amount of moisture has been carried away, through still a third chamber, continuing this operation for the different chambers, and successively cutting out of the circuit the chambers as the articles therein are dried.

7. The method of drying articles in a series of chambers containing such articles which comprises drawing a heated gas through one chamber until a predetermined amount of moisture has been carried away, then drawing the gas through said chamber and through another chamber serially connected, and after a certain amount of moisture has been carried away, through still a third chamber, continuing this operation for the different chambers, successively cutting out of the circuit the chambers as the articles therein are dried, and evacuating each of the chambers as it is cut out of the circuit.

I testimony whereof, I hereunto affix my signature.

WILLARD L. REINHARDT.